Mar. 20, 1923.
S. RICHARDS.
PANORAMIC CAMERA.
FILED FEB. 2, 1922.
1,449,295.
3 SHEETS—SHEET 1.
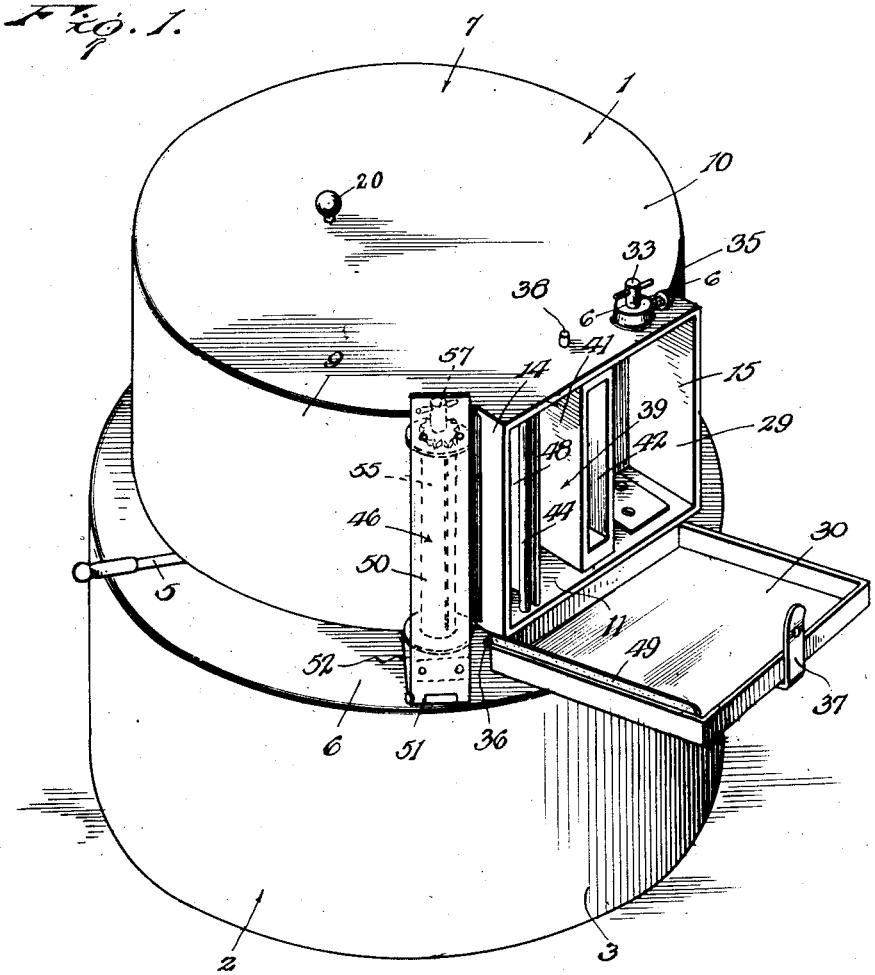
Inventor
S. Richards.
By
Lacey & Lacey, Attorneys

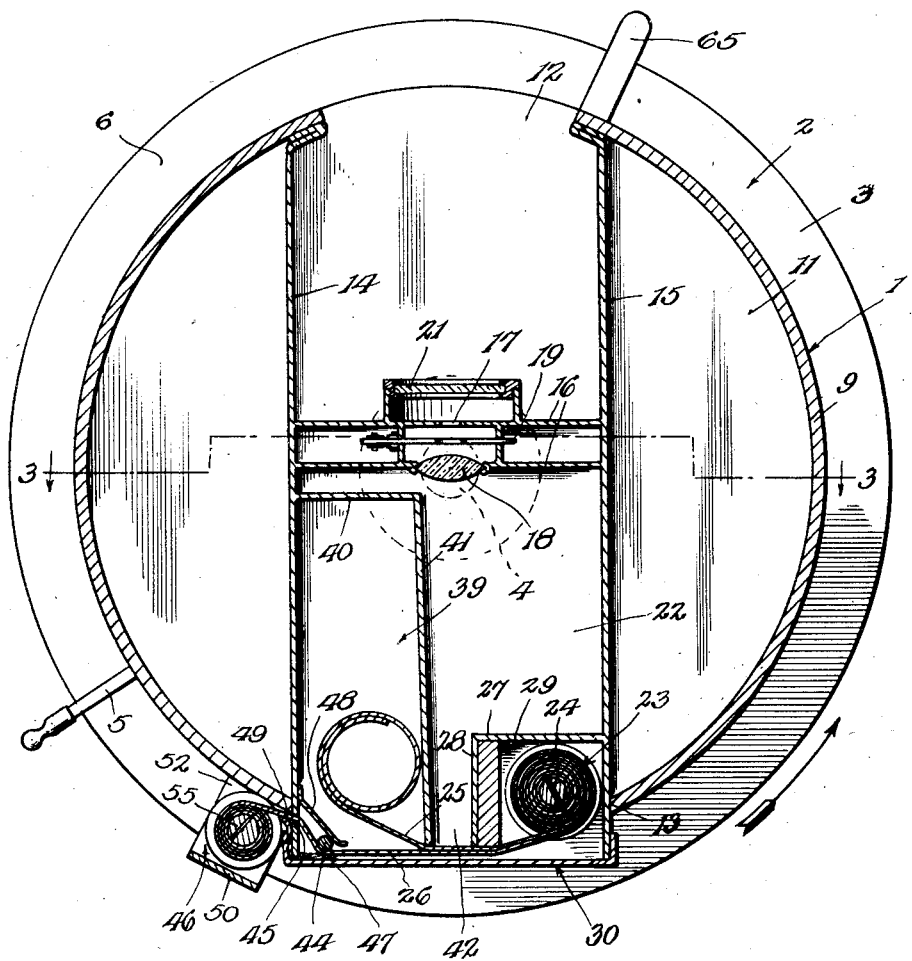

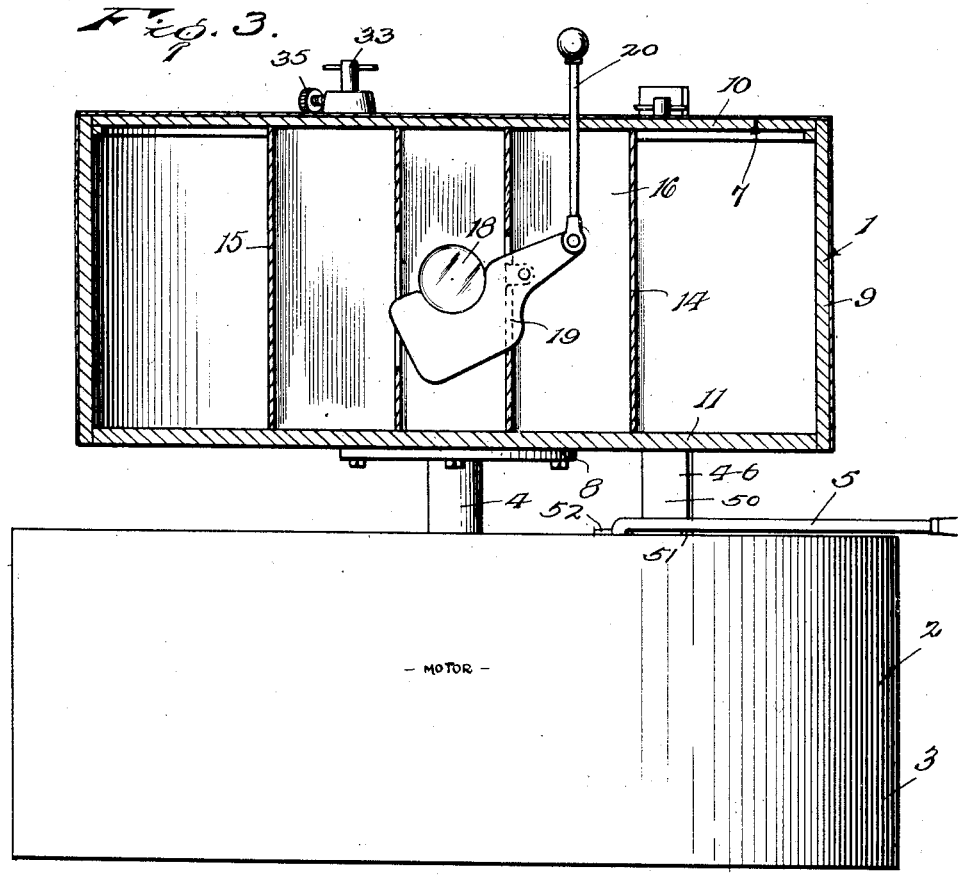
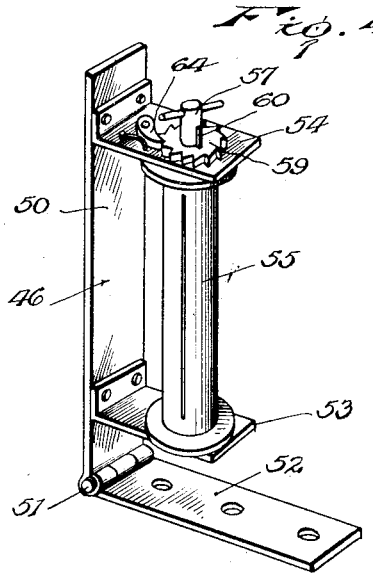
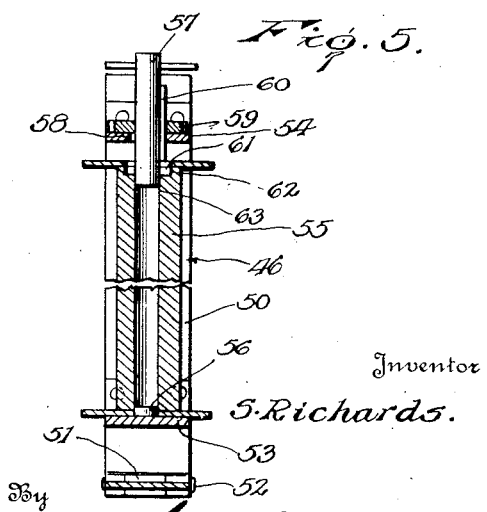

Patented Mar. 20, 1923.

1,449,295

UNITED STATES PATENT OFFICE.

SAMUEL RICHARDS, OF LOGAN, UTAH, ASSIGNOR OF ONE-HALF TO PAUL M. PAULSON, OF LOGAN, UTAH.

PANORAMIC CAMERA.

Application filed February 2, 1922. Serial No. 533,641.

*To all whom it may concern:*

Be it know that I, SAMUEL RICHARDS, a citizen of the United States, residing at Logan, in the county of Cache and State of Utah, have invented certain new and useful Improvements in Panoramic Cameras, of which the following is a specification.

This invention relates to improvements in panoramic cameras.

The majority of panoramic cameras are unsatisfactory in operation for the reason that photographs produced thereby exhibit aberrations of one kind or another and therefore do not accurately present the view as seen by the eye. These unsatisfactory results are assignable to various causes among which may be mentioned the location of the lens in an inappropriate position with relation to the axis about which the photographic apparatus is rotated, the disposal of the film in an arc concentric to the lens so that its sensitized face is curved instead of flat, and the imperfect feeding of the film past the exposure aperture.. Therefore it is one of the primary objects of the present invention to provide a panoramic camera by the use of which photographs may be taken accurately depicting the view precisely as seen by the eye.

As stated above one of the reasons for failure of the usual panoramic camera to produce photographs accurately depicting the view photographed is the inappropriate location of the camera lens with relation to the axis about which the apparatus is revolved. For example, in most cameras of this type, the lens is located eccentric to said axis with the result that the picture produced has its perspective distorted or more or less curved. Therefore the present invention has as another of its important objects to provide a panoramic camera in which the lens will be located coincident with the axis of rotation of the exposure apparatus as a whole so that the lens does not sweep in an arc about this axis at a point more or less remote therefrom, but merely turns about the axis as a center. As a result of this location of the lens, a photograph produced by the camera will be free from the cylindrical aberration which is presented by photographs taken with cameras in which the lens is otherwise located.

As previously stated another cause of cylindrical aberration noticed in photographs taken by the use of some of the ordinary types of panoramic cameras is the disposal of the film or other sensitized medium in a curvilinear form, usually on the arc of a circle having the axis of the lens as a center. Photographs made by the use of the ordinary camera are free from this defect because the sensitized medium is held flat when in position before the lens, and therefore the present invention has as a further object to provide for passage of the film or other sensitized medium past the exposure aperture of the camera in flat condition.

Another important object of the invention is to provide in a panoramic camera, means for effecting a movement of the film past the exposure aperture in accurately timed relation to the angular movement of the exposure apparatus, and with such precision that the resulting photographs will be entirely free from striations and other similar defects which are caused when the sensitized medium is fed with a step by step movement and not in exact timed relation to the angular movement of the line of focus.

Another object of the invention is to so construct the camera that, in its operation, it will photograph a view of maximum scope or range.

Another object of the invention is to provide a panoramic camera which will be entirely automatic in its action when set in operation and will not require any attention on the part of the photographer until after it has ceased to function in photographing the subject.

A further object of the invention is to provide a panoramic camera adapted for the employment of ordinary film rolls of any of the standard lengths and in which means is provided for utilizing the entire length of film in the making of successful exposures and without the necessity of opening the camera back or removing or otherwise disturbing the film roll.

The invention has as an important object to provide for automatic rotation of the exposure apparatus about its axis and for effecting a feeding of the film past the exposure aperture precisely in timed relation to the speed of angular movement of the apparatus and regardless of the quantity of film upon the film spool.

Another object of the invention is to provide means whereby the film spool may be readily disposed within the camera and the film and its backing readily arranged for the exposure of the former, and to likewise provide for as ready removal of the film after exposure and in daylight.

In the accompanying drawings:

Figure 1 is a perspective view of the camera embodying the present invention, the back being shown open;

Figure 2 is a horizontal sectional view taken through the exposure apparatus of the camera;

Figure 3 is a transverse sectional view taken substantially on the line 3—3 of Figure 2 looking in the direction indicated by the arrows;

Figure 4 is a perspective view of the means provided for holding the backing strip of the film roll stationary during the exposure period;

Figure 5 is a vertical transverse sectional view through the device shown in Figure 4; and Figure 6 is a detail vertical sectional view taken substantially on the line 6—6 of Figure 1.

The camera embodying the invention comprises, generally speaking, an exposure apparatus indicated in general by the numeral 1 and a motor indicated in general by the numeral 2 supporting the exposure apparatus and operable to impart the necessary angular movement thereto in the operation of the camera. As various types and constructions of motors may be employed, and as the particular motor selected forms no part of the present invention, it is considered unnecessary to specifically illustrate or describe the same, and it will suffice to say that the motor mechanism is preferably mounted in a casing 3 and includes a shaft which is indicated by the numeral 4, a suitable controlling means, indicated in general by the numeral 5, being provided for setting the motor in operation and stopping its operation. The casing 3 may be of any form found most suitable and it preferably includes a top which is indicated by the numeral 6 and above and in spaced relation to which the exposure apparatus 1 is arranged, the component parts of the apparatus being likewise housed within a casing indicated in general by the numeral 7 and fixedly supported as at 8 upon the upper end of the shaft 4. The casing 7 comprises a circumferential wall 9, a top 10, and a bottom 11, the casing being preferably of substantially cylindrical form, and being so supported upon the upper end of the motor shaft 4 as to be axially in alignment with said shaft.

At the front and back, and consequently at diametrically opposite points, the wall 9 of the casing 7 is formed with openings indicated respectively by the numerals 12 and 13, and partition walls 14 and 15 are arranged within the casing with their ends suitably secured to the wall 9 at opposite sides of the openings 12 and 13, the said partition walls extending from the top to the bottom of the casing. A partition wall 16 extends from top to bottom of the casing and transversely between the partition walls 14 and 15, this wall being located substantially immediately above the motor shaft 4 as clearly shown in Figure 2 of the drawings. The partition 16 is formed with a lens opening 17 and supports a lens 18 of the usual type, this lens being located axially opposite the opening 17 and being further so positioned that its center will be immediately in alignment with the axis of the motor shaft 4. A shutter 19 is also mounted upon the partition 16 between the aperture 17 and lens 18 and is adapted to be actuated through the manipulation of a plunger rod or the like indicated by the numeral 20. Any suitable type of shutter may be employed in connection with the lens and the aperture 17 and the shutter may be actuated in any desired manner and serves the usual function of controlling the passage of light rays through the aperture to the lens and finally to the sensitized medium. If desired provision may be made for the mounting of a ray filter 21 in proper relation to the lens opening 17 and lens 18.

Being located approximately above the motor shaft, the partition 16 occupies a position substantially midway between the ends of the partition walls 14 and 15, and as the opening 12 is at all times uncovered, light rays may pass freely to the aperture 17 and 18 through the space in front of the partition. The partition 16 and the walls 14 and 15, together with the camera back which will presently be described, define an exposure chamber 22 through which the light rays pass through the lens 18 to the sensitized medium.

The invention contemplates the employment of a film roll as the sensitized medium, and such a roll is illustrated in the drawings and indicated in general by the numeral 23 and consists, as usual, of the usual spool 24, film strip 25, and opaque backing strip 26. Walls 27 and 28 which extend from top to bottom of the casing and respectively across and longitudinally of the chamber 22, define, in connection with the partition wall 15, a compartment 29 to receive the film roll 23, this compartment opening at the rear of the camera casing and being normally closed by the camera back which is indicated in general by the numeral 30. As the spool 24 is of the ordinary construction, it is provided with the usual spindle receiving socket 31 having the usual radial seats 32. The numeral 33 indicates a winding key of the ordinary type rotatably mounted within the top 10 of the casing 7 and provided with the usual radial lugs 34 adapted to engage in the branches 32 of the socket 31 when the key is pushed downwardly through the top and into engagement with the upper end of the spool 24 which spool is disposed in upright position within the compartment 29. The key 33 is employed in rewinding the film and the backing strip onto the spool after exposures have been made upon the film, and in order that the key may be held elevated and out of engagement with the spool so as to permit of free rotation of the spool within the compartment 29, a set screw 35 is preferably threaded through the bearing for the key and is adapted to be tightened so as to bind against the key for the purpose stated. At this point it may be observed that the compartment 29 is of such dimensions as to more or less snugly receive the film roll 23 so that the roll will be supported in upright position within the compartment and may rotate freely in the unwinding of the film and its backing strip therefrom.

The camera back 30 is hingedly mounted at its lower end as at 36 and is adapted to be held closed in any suitable manner as for example by a spring latch 37 carried at its free side and engageable with its keeper 38 upon the top 10 of the casing 7. This back when in closed position is designed to close the rear end of the exposure chamber 22 in a light-tight manner and it likewise closes the open side of the compartment 29 thus excluding light from the film roll contained within the compartment.

The numeral 39 indicates a film receiving compartment defined by the partition wall 14, a transverse wall 40, and a longitudinally extending wall 41 which latter wall is parallel to the wall of the compartment 29 and suitably spaced therefrom so as to provide an exposure aperture or slot indicated by the numeral 42 and which is of a height substantially equal to the width of the film strip. The rear edges of the walls 28 and 41 define the exposure aperture 42, and the film strip 25, as it is unwound from the spool 24, is to be moved transversely across this aperture substantially in contact with the said edges of the said walls. Arranged within the rear end of the chamber 22, in upright position, is an idle guide roll 44 about which the backing strip 26 of the film roll is to be led, the said strip, after passing about the roll 44, being threaded through a slot 45 formed in the projecting rear end of the partition wall 14 and being then led to and connected with an anchoring device which is indicated in general by the numeral 46 and which will presently be more specifically described. Preferably a strip 47 of felt or other suitable material is provided upon the inner face of the hinged back 30 so that when the back is in closed position this strip will bear against the portion of the backing strip 26 which is passed about the roll 44, light being thus excluded from the interior of the chamber 22. A baffle 48 is likewise secured upon the inner side of the wall 14 and bears against the forward side of the roll 44 for a like purpose. Also if desired a strip 49 of felt or other material may be arranged upon that side of the back 30 which is adjacent the anchoring means 46 so as to assist in closing the slot 45 and preventing the entrance of light rays through this slot into the chamber 22.

The anchoring device for the backing strip of the film roll is most clearly illustrated in Figures 4 and 5 of the drawings and the same comprises a leaf 50 which is hinged at its lower ends as at 51 to a plate 52 secured to the upper side or top 6 of the motor casing 3 as shown in Figures 1 and 2. A supporting bracket 53 is carried by the leaf 50 near its hinged end, and a similar bracket 54 is carried by the leaf near its free end and is suitably spaced from the bracket 53 to provide for the accommodation between the brackets of a film spool 55. The bracket 53 is preferably provided with a short stud 56 upon which the lower end of the spool 55 may be mounted, and the bracket 54 supports a winding key 57 rotatably mounted in an opening 58 formed in said bracket. The key 57 fits slidably through a ratchet 59 and is provided with a spline 60 whereby the ratchet is connected therewith for rotation. Near its lower end the key is provided with the usual radial lugs 61 which are adapted to engage in the branches 62 of the key socket 63 in the upper end of the spool 55, when the key is in the lowered position shown in Figure 5. However the key may be elevated so as to disengage the lugs 61 from the spool while the lower end of the key still remains in engagement in the socket 63, in which position of the key the spool may be freely rotated. Rotation of the spool in one direction, when the key is lowered, is prevented however through the provision of a pawl 64 mounted upon the bracket 54 and coacting with the ratchet 59.

Rotative movement of the exposure apparatus 1 through the medium of the motor 2 is limited by the provision, upon the casing of the apparatus, of an abutment finger 65 which is designed to strike against the leaf 50 of the anchoring device 46 when the motor has rotated the apparatus through a predetermined arc.

The camera is operated as follows: A film roll of any standard make and of a size adapted for the particular camera, is disposed within the compartment 29 and the backing strip and the film and unwound therefrom until the usual seal connecting these two strips is exposed whereupon this seal is broken and the end of the film strip is directed into the open rear end of the film receiving compartment 39. The end of the backing strip is however led about the roll 44 and through the slot 45 and connected with the spool 55, the spool being rotated to wind up the surplus or slack length of the said backing strip and until it and the film strip are substantially tautly drawn across the exposure aperture 42. Due to the coaction of the pawl 64 with the ratchet 59, the spool 55 will now be held against backward rotation. The camera back 30 is then closed, and the camera is ready for the making of an exposure. When the exposure is to be made and the camera has been suitably placed to take in the view or other subject which is to be photographed the member 20 is actuated to open the shutter 19, and at the same time the controlling member 5 of the motor is operated to start the motor. The operation of the motor will serve to gradually but steadily rotate the exposure apparatus causing the open front 12 of the casing thereof to sweep through the arc of a circle having as its center the axis of the motor shaft 4. In the rotation of the exposure apparatus, the lens 18 will pivot above the axis of the said shaft 4, and the light rays will pass through the lens and exposure aperture 42 to the film strip. As the end of the backing strip 26 is anchored by the drive 46, and as the exposure apparatus is rotating past the anchoring device, the backing strip will be unwound from the film roll 23 and about the circumferential wall 9 of the casing 7 of the exposure apparatus. The unwinding of this backing strip effects an unwinding of the film strip with the result that the film strip is moved across the exposure aperture 42 and fed continuously into the compartment 39 where it will naturally assume a rolled or coiled form as illustrated in Figure 2. The portion of the film passing across the exposure aperture 42 will be caused to assume a flat form and it will be spaced from the lens 18 a distance equal to the focal length of the lens. It will therefore be apparent that the speed of travel of the film strip across the exposure aperture 42 will be in exact consonance with the speed of angular movement of the apparatus as a whole with the result that all portions of the film passing the said exposure aperture will be exposed for precisely the same period of time.

If after one exposure has been made there is a sufficient length of film remaining for another or other exposures, the exposure apparatus may be rotated backward to its original position, and the spool 55 then rotated to take up the slack length of the backing strip 26 whereupon the camera is ready for further use. When the whole of the film strip has been exposed or it becomes desirable to remove the film roll from the camera for development, the set screw 35 is loosened, the key 57 is shifted to its elevated position to permit free rotation of the spool 55 upon which the backing strip has been wound, and the key 33 is then moved downwardly into engagement with the spool 24 and rotated to rewind the film and backing strip thereon, and after this operation has been completed the camera back 30 may be opened and the rewound roll removed.

Having thus described the invention what is claimed as new is:

1. In a panoramic camera, revoluble exposure apparatus including a lens having its optical center positioned coincident with the axis of rotation of the apparatus, the apparatus having an exposure aperture in the focus of the lens, means at one side of the aperture for supporting a film roll including a film and its backing, means at the other side of the aperture for receiving the film unwound from the roll and traversing the aperture, and means for holding stationary the said backing.

2. In a panoramic camera, revoluble exposure apparatus including a lens having its optical center positioned coincident with the axis of rotation of the apparatus, the apparatus having an exposure aperture in the focus of the lens, means at one side of the aperture for supporting a film roll including a film and its backing, a film receiving compartment at the other side of the aperture to receive the film unwound from the roll and traversing the aperture, and means non-rotatable with the apparatus for anchoring the said backing whereby to effect an unwinding of the film and the feeding of the same across the aperture as the apparatus is revolved.

3. In a panoramic camera, revoluble exposure apparatus including an exposure chamber, a lens associated therewith in position with its optical center coincident with the axis of rotation of the apparatus, the said chamber having an exposure aperture opposite the lens, means at one side of the aperture for supporting a film roll including a film and its backing strip, means at the other side of the aperture for receiving the film unwound from the roll and passed across the aperture, and stationary means located exterior to the exposure chamber for securing and holding stationary the said backing strip whereby to effect such unwinding of the film from the roll in rotation of the apparatus.

4. In a panoramic camera, revoluble exposure apparatus including an exposure chamber, a lens mounted in one end of the chamber above the axis of rotation of the apparatus, film roll storage and film receiving compartments arranged in spaced relation within the other end of the exposure chamber and defining them between an exposure over which the film unwound from a roll within the storage compartment is to pass in the rotation of the apparatus, and means exterior of the exposure chamber for holding stationary the backing strip of the film roll whereby upon rotation of the exposure apparatus the said backing strip will be unwound from the roll within the storage compartment thus effecting an unwinding of the film from the roll and the passage of the film across the exposure aperture and into the film receiving compartment.

5. In a panoramic camera, a revoluble exposure apparatus including a lens arranged with its optical center coincident with the axis of rotation of the apparatus, an exposure chamber within which the lens is arranged, the said exposure chamber having an exposure aperture in the focal length of the lens, means at one side of the aperture for storing a film roll including a sensitized film and a backing therefor, means at the other side of the aperture for receiving the film unwound from the roll and passing across the aperture, and means exterior to the exposure chamber for anchoring the backing strip of the roll whereby when the apparatus is rotated the said backing strip will be unwound from the roll thus effecting an unwinding of the film strip and its passage across the exposure aperture.

6. In a panoramic camera, a revoluble exposure apparatus including a lens arranged with its optical center coincident with the axis of rotation of the apparatus, an exposure chamber within which the lens is arranged, the said exposure chamber having an exposure aperture in the focal length of the lens, means at one side of the aperture for storing a film roll including a sensitized film and a backing therefor, means at the other side of the aperture for receiving the film unwound from the roll and passing across the aperture, and means exterior to the exposure chamber for anchoring the backing strip of the roll whereby when the apparatus is rotated the said backing strip will be unwound from the roll thus effecting an unwinding of the film strip and its passage across the exposure aperture, the said means comprising a winding spool operable to wind up a slack length of the backing strip, and means for holding the roll against rotation in the opposite direction.

In testimony whereof I affix my signature.

SAMUEL RICHARDS. [L. S.]